(12) United States Patent
Shimada (10) Patent No.: US 9,785,014 B2
(45) Date of Patent: Oct. 10, 2017

(54) MANUFACTURING METHOD AND MANUFACTURING APPARATUS OF LIQUID CRYSTAL DISPLAY DEVICE

(71) Applicant: Japan Display Inc., Minato-ku (JP)

(72) Inventor: Yojiro Shimada, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/613,527

(22) Filed: Feb. 4, 2015

(65) Prior Publication Data

US 2015/0227006 A1 Aug. 13, 2015

(30) Foreign Application Priority Data

Feb. 7, 2014 (JP) .................................. 2014-022202

(51) Int. Cl.
*G02F 1/1337* (2006.01)
*G02F 1/1341* (2006.01)
*G02F 1/13* (2006.01)

(52) U.S. Cl.
CPC ...... *G02F 1/133788* (2013.01); *G02F 1/1303* (2013.01)

(58) Field of Classification Search
None
See application file for complete search history.

(56) References Cited

U.S. PATENT DOCUMENTS

2013/0143007 A1* 6/2013 Kim ..................... G03F 1/50
428/195.1
2014/0360860 A1* 12/2014 Miyachi ............ G02F 1/133788
204/157.69

FOREIGN PATENT DOCUMENTS

| JP | 2004-144884 | | 5/2004 |
| TW | 201312229 | | 3/2013 |
| WO | WO 2013031462 | * | 3/2013 |

OTHER PUBLICATIONS

Office Action dated Jun. 22, 2017, in Chinese Patent Application No. 201510060923.0 w/English-language translation.

* cited by examiner

Primary Examiner — Caleb Henry
Assistant Examiner — Mounir Amer
(74) Attorney, Agent, or Firm — Oblon, McClelland, Maier & Neustadt, L.L.P.

(57) ABSTRACT

In a photo alignment process according to a manufacturing method of a liquid crystal display device including a display panel with a liquid crystal layer interposed between substrates, in order to even the exposure amount of ultraviolet light in an area of a substrate passing through the lower central portion of a bar-like UV lamp arranged in a prolonged way in a direction crossing the proceeding direction of the substrate and in an area of the substrate passing through the end portions thereof, the ultraviolet light is irradiated through an aperture having a larger opening width in the end portions than in the center portion.

6 Claims, 10 Drawing Sheets

MANUFACTURING METHOD AND MANUFACTURING APPARATUS OF LIQUID CRYSTAL DISPLAY DEVICE

CLAIM OF PRIORITY

The present application claims priority from Japanese patent application JP 2014-22202 filed on Feb. 7, 2014, the content of which is hereby incorporated by reference into this application.

BACKGROUND OF THE INVENTION

Field of the Invention

The invention relates to a manufacturing method and a manufacturing apparatus of a liquid crystal display device having a photo alignment film.

Description of the Related Art

A liquid crystal display device, having the features of high display quality, thinness, lightness in weight, and low power consumption, is expanding application and variously used in a monitor for portable device such as a monitor for cellular phone and a monitor for digital still camera, a monitor for disk top personal computer, a monitor for printing and design, a medical monitor, and a liquid crystal television. With the expansion of the application, higher image quality and higher quality is required of a liquid crystal display device, and especially higher luminance caused by higher transmittance and lower power consumption is strongly required. According to the prevalence of a liquid crystal display device, there is also a strong demand for cost reduction.

Usually, a liquid crystal display device performs display by applying an electric field to liquid crystal molecules of a liquid crystal layer interposed between a pair of substrates to change the alignment direction of the liquid crystal molecules and accordingly change the optical characteristic of the liquid crystal layer. The alignment direction of the liquid crystal molecules without application of electric field is defined by an alignment film with rubbing treatment performed on the surface of a polyimide thin film. There are, however, some problems such as generation of static electricity or foreign substance due to the rubbing treatment and unevenness of the rubbing treatment due to an uneven substrate surface; therefore, a photo alignment method with no need to contact with a rubbing cloth is getting adopted. The photo alignment method is a method of giving alignment capacity to the surface of an organic film formed on the substrate surface by irradiating linearly-polarized UV lights to the surface of the organic film. An ultraviolet light (UV) irradiation device for photo alignment is disclosed in, for example, Japanese Patent Publication No. 2004-144884.

SUMMARY OF THE INVENTION

Figure 1:
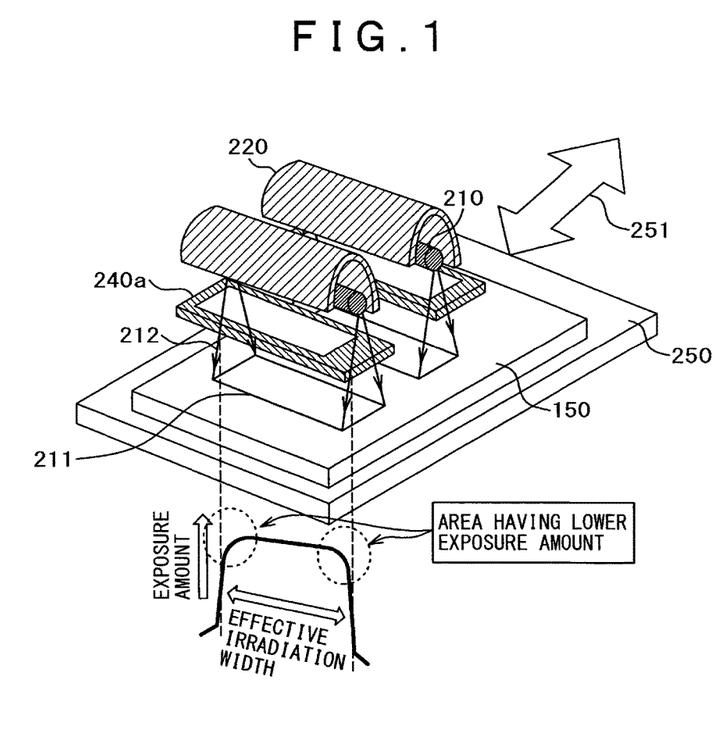
FIG. 1 is a schematic perspective view of a UV irradiation device for use in describing photo alignment processing, examined by the inventors.
Figure 6:
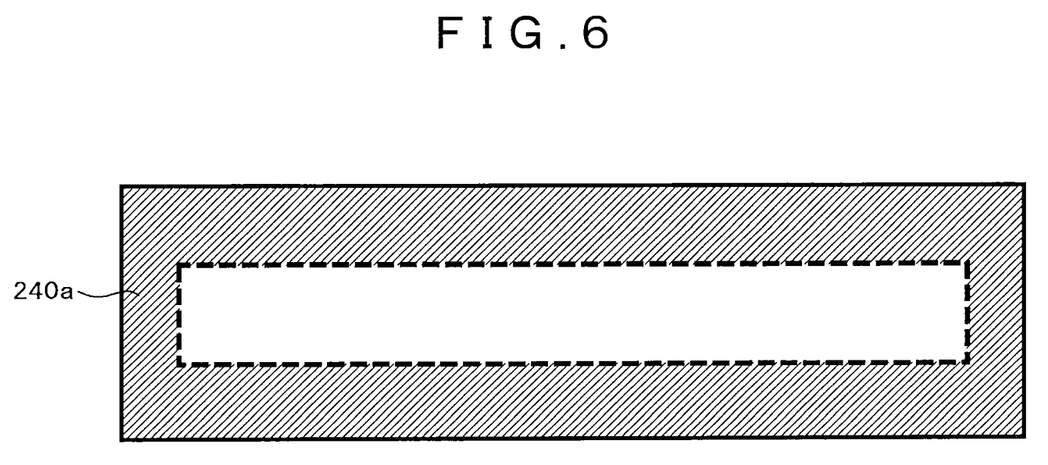
FIG. 6 is a schematic top plan view of an aperture in the UV irradiation device examined by the inventors.

These days, in a liquid crystal display device for mobile, especially in a TFT substrate where TFT is formed, according to miniaturization of the TFT and an increase of roughness on the TFT substrate, there is a fear of hardly obtaining a sufficient alignment capacity well especially in a step portion through the rubbing. Then, the inventors perform the alignment processing on an alignment film for mobile using a UV irradiation device having the proven alignment processing in a liquid crystal display device for large sized TV (refer to FIG. 1). The UV irradiation device includes a long arc type discharge lamp (bar-like UV lamp) 210 for irradiating light including ultraviolet light, a trough-shape collection mirror 220 having an elliptical cross section, an aperture 240a (refer to FIG. 6) having a rectangular opening which defines an irradiation area of ultraviolet light, and a scan stage 250 where a substrate 150 targeted for alignment processing is mounted. The alignment processing is performed by moving the scan stage 250 where the substrate 150 including a plurality of display panel areas in a longitudinal direction of the long arc type discharge lamp is mounted, to an area 211 irradiated with the ultraviolet light 212 (accurately, an ultraviolet light linearly-polarized by polarizer) through the aperture 240a. A reference numeral 251 denotes a scanning direction.

As a result, in the bar-like UV lamp, the exposure amount is reduced in the end portions in the longitudinal direction. In a display panel of medium and small size, since a plurality of display panel areas are arranged in the longitudinal direction of the bar-like UV lamp, it is proved that the exposure amount becomes various in every display panel, hence to reduce the yield and that when only the area having the exposure amount within the tolerance (±5%) is selected, a throughput is reduced. Further, when the exposure amount becomes uneven, there occurs a problem of quality reduction in the substrate surface including a plurality of display panel areas. When an ultraviolet light intensity is enhanced in order to restrain the reduction of the exposure amount, manufacturing cost is increased according to an increase of energy. In the case of a display panel for a large size TV, since only some display panel areas are arranged in the longitudinal direction of the long arc type discharge lamp, the exposure amount is not so various in every display panel and the fluctuation in the display panels is within the tolerance of ±15%, which does not seem to be a big problem.

An object of the invention is to provide a manufacturing method and a manufacturing apparatus of a liquid crystal display device capable of performing photo alignment evenly.

As one embodiment to achieve the above object, there is provided a manufacturing method of a liquid crystal display device including a display panel with a liquid crystal layer interposed between substrates, comprising:

a first process of preparing a first substrate with a thin film transistor formed there;

a second process of forming a photo alignment film on the first substrate;

a third process of irradiating the photo alignment film with ultraviolet light emitted from a bar-like UV lamp to align the photo alignment film; and a fourth process of interposing the liquid crystal layer between the first substrate and the second substrate, wherein in order to even the exposure amount of the ultraviolet light in a first area of the first substrate passing through a lower central portion of the bar-like UV lamp arranged in a prolonged way in a direction relatively crossing a proceeding direction of the first substrate and in a second area of the first substrate passing through the end portions thereof, in an aperture for defining an irradiation area of the ultraviolet light, areas corresponding to the first area and the second area are different in opening width, or different in ultraviolet light transmittance.

A manufacturing apparatus of a liquid crystal display device for use in alignment of a photo alignment film, comprising:

a bar-like UV lamp;

an aperture for defining an irradiation area of ultraviolet light emitted from the bar-like UV lamp; and a scan stage movable in a direction orthogonal to a longitudinal direction of the bar-like UV lamp; wherein in order to even the exposure amount of the ultraviolet light in a first area of the substrate passing through the lower central portion of the bar-like UV lamp arranged in a prolonged way in a direction crossing the proceeding direction of the substrate mounted on the scan stage and in a second area of the substrate passing through the end portions thereof, the aperture has the areas corresponding to the first area and the second area with different opening widths, or with different ultraviolet light transmittances.

DETAILED DESCRIPTION OF THE PREFERRED EMBODIMENTS

Hereinafter, embodiments of the invention will be described with reference to the drawings.

The disclosure is only one example and various modifications which can be easily arrived at by those skilled in the art, within the sprit of the invention, are naturally to be included in the scope of the invention. Further, for the sake of clearer description, the width, thickness, and shape of each unit are schematically represented, differently from the actual ones, and they are only one example and not to restrict the interpretation of the invention.

In the specification and the drawings, the same reference numerals are attached to the same elements having been described as for the drawing already described and their detailed description is properly omitted.

First Embodiment

Figure 2:
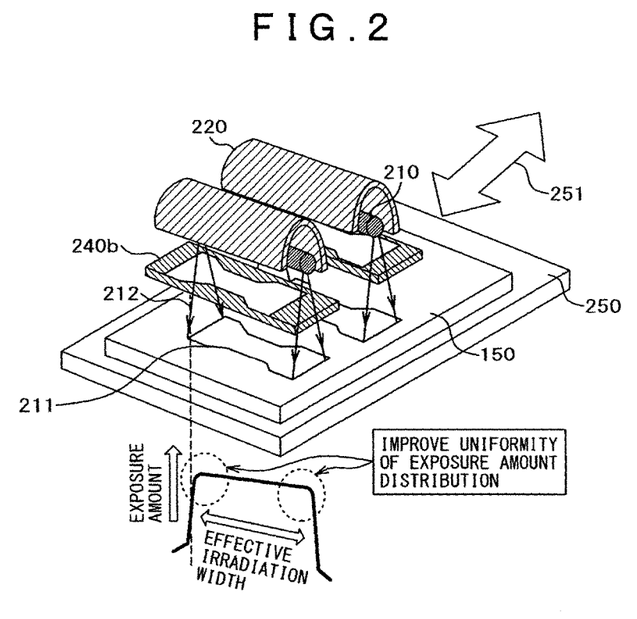
FIG. 2 is a schematic perspective view of the UV irradiation device for use in describing the photo alignment processing in a manufacturing method of a liquid crystal display device according to a first embodiment of the invention.
Figure 3:
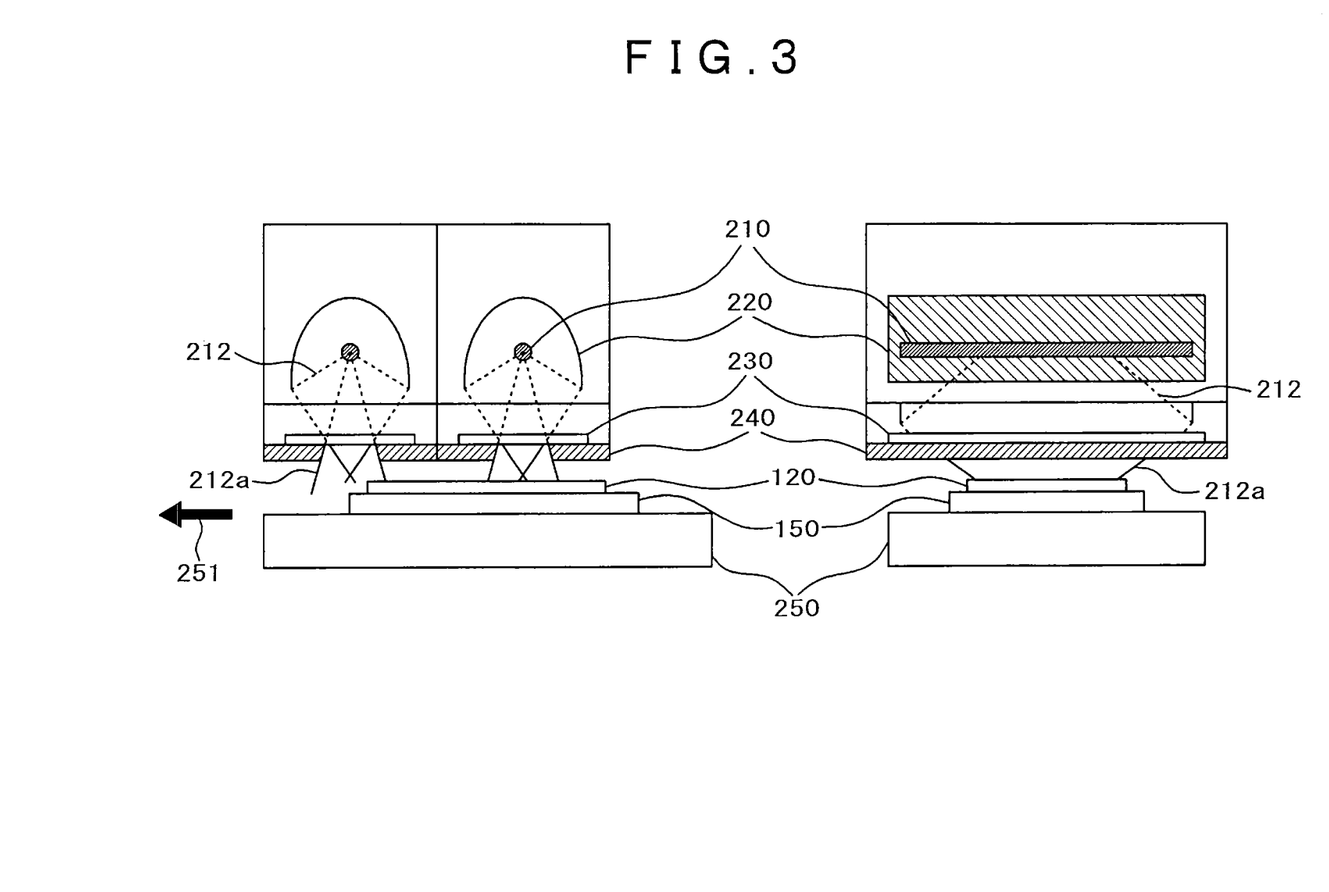
FIG. 3 is a schematic view (partly perspective view) of the UV irradiation device according to the first embodiment of the invention: the right view is viewed from the direction (stage moving direction) orthogonal to the longitudinal direction of a long arc type discharge lamp, and the left view is viewed from the longitudinal direction of the long arc type discharge lamp.

A manufacturing apparatus (UV irradiation device) of a liquid crystal display device according to a first embodiment of the invention will be described using FIGS. 2, 3, and 7. FIG. 2 is a schematic perspective view of a UV irradiation device for use in describing photo alignment processing in a manufacturing method of a liquid crystal display device according to the embodiment. FIG. 3 is a side elevational view (partly perspective view) of the UV irradiation device: the right view is viewed from the direction orthogonal to the longitudinal direction of a long arc type discharge lamp (bar-like UV lamp) and the left view is viewed from the longitudinal direction of the bar-like UV lamp.

The UV irradiation device includes a bar-like UV lamp 210, a trough-shape collection mirror 220 for collecting UV lights 212 irradiated from the bar-like UV lamp, a polarizer 230 for passing a linearly polarized light 212a of the UV lights 212 collected by the trough-shape collection mirror, an aperture 240 for defining an irradiation area of the linearly polarized light 212a, and a scan stage 250 for mounting and moving a substrate 150 with a photo alignment film 120 formed thereon, as illustrated in FIG. 3. A wavelength selection film can be also arranged between the substrate and the polarizer. This can exclude a light of unnecessary wavelength which does not attribute to the alignment of the photo alignment film. By relatively moving the substrate and the irradiation area of a polarized light using the bar-like UV lamp, a wide area can be irradiated with the polarized light without using a large sized optical component. FIG. 2 is basically the same as FIG. 1 except for the aperture shape (described later) and therefore, the description is omitted.

Figure 7:
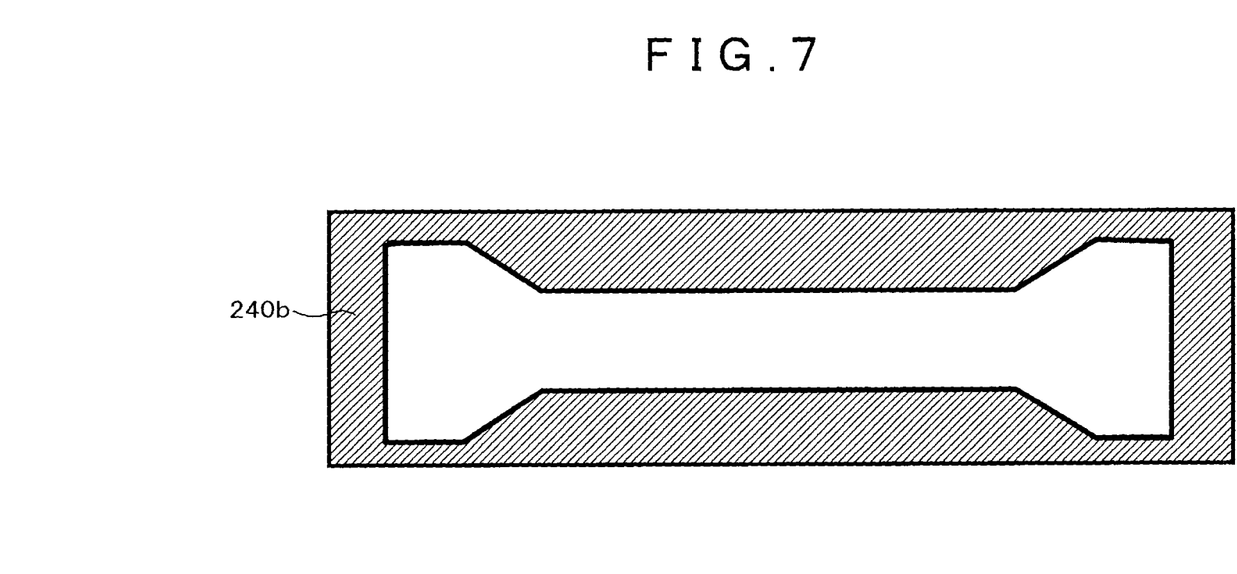
FIG. 7 is a schematic top plan view of the aperture in the UV irradiation device according to the first embodiment of the invention.
Figure 8:
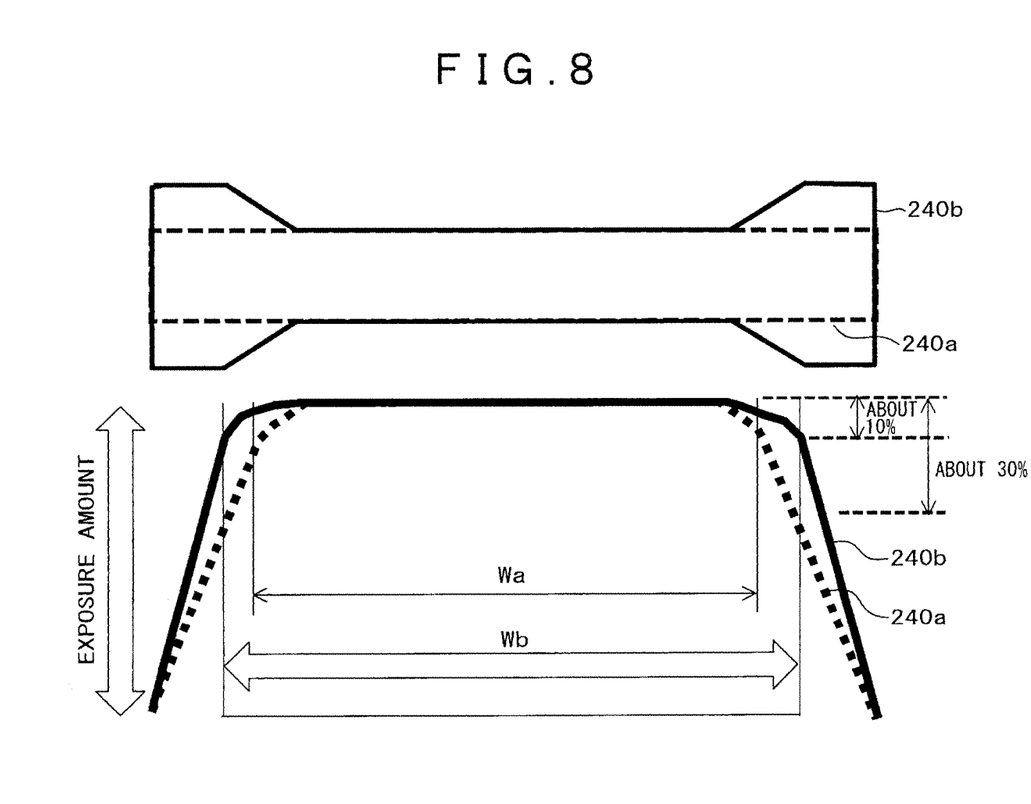
FIG. 8 is a comparison view for use in describing the exposure amount distribution when using the aperture of FIG. 6 and the aperture of FIG. 7.

FIG. 7 is a schematic top plan view of an aperture 240b in the UV irradiation device. In the embodiment, the shape of the aperture in the UV irradiation device is changed from the rectangle shape indicated in FIG. 6 to a home base shape having the maximum width in the portions corresponding to the both end portions of the bar-like UV lamp in the longitudinal direction as illustrated in FIG. 7. In other words, the aperture is formed in a shape in which the width of the opening in the end areas of the longitudinal direction distant from the center of the bar-like UV lamp is a little wider. In this occasion, in order to avoid a sharp change in the area, it is preferable that the both end portions have a taper shape (the taper portion can be formed in a shape of short quick steps). Since the stage moves in a direction orthogonal to the longitudinal direction of the bar-like UV lamp, the aperture shape is adjusted so that the total accumulated amount of exposure (cumulative amount) may be flat (even). The accumulated amount of exposure is measured using a polarization measuring unit set in the device while moving the stage in the stage moving direction. Distribution (in the longitudinal direction of lamp) is measured by deviating the position of the polarization measuring unit. According to this, as illustrated in FIG. 8, evenness of the exposure amount can be improved (Wb>Wa: Wb is the effective range width in the aperture used in the embodiment (within tolerance of ±5%), and Wa is the effective range width in the rectangular aperture (within tolerance of ±50)). Further, it is found from the figure that the case of using the aperture of the shape indicated in FIG. 7 with the tolerance of ±5% (within the range of 10%) can obtain the effective irradiation width better than the case of using the rectangular aperture with the tolerance of ±15% (within the range of 30%). Further, variations of the exposure amount can be reduced in the glass substrate surface including a plurality of display panel areas, hence to improve the productivity, reduce the energy and therefore reduce the manufacturing cost. Especially, by using the device, the exposure amount distribution becomes even, hence to solve the quality problem occurring in the photo alignment process.

Finally, the detailed aperture shape is preferably changed depending on the exposure properties of a lamp. When there are a plurality of bar-like UV lamps, the respective shapes are preferably changed according to the properties of the respective bar-like UV lamps.

Figure 4A:
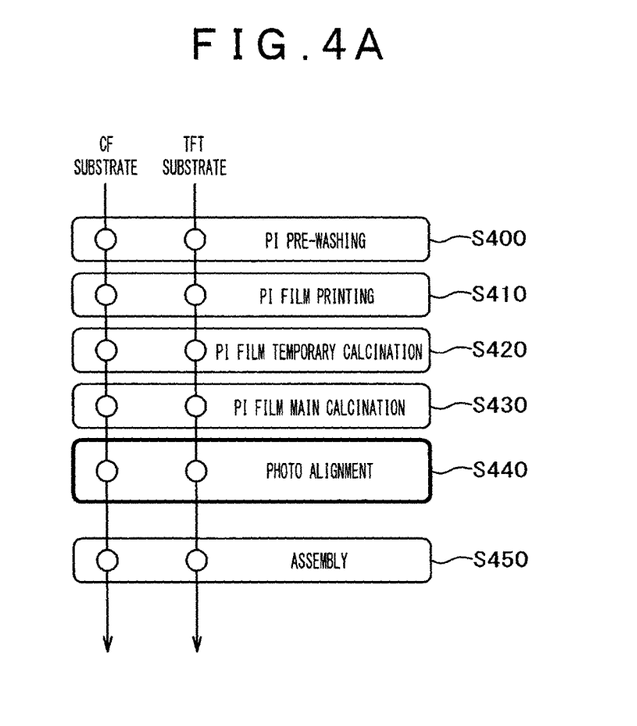
FIG. 4A is a flow chart of an alignment film forming process in the manufacturing method of a liquid crystal display device according to the first embodiment of the invention.

A manufacturing method of a liquid crystal display device will be described mainly in the alignment film process, using FIGS. 4A, 4B, 5A, and 5B. FIG. 4A is a flow chart of the alignment film forming process in the manufacturing method of a liquid crystal display device according to the first embodiment of the invention. In either case of using the CF substrate or the TFT substrate, just the layer structure of the substrate is different but the alignment film forming process is basically the same; therefore, a description will be made by using the TFT substrate as an example. However, since the CF substrate has a better flatness on the surface than the TFT substrate, alignment processing can be performed through rubbing, instead of the photo alignment processing.

Figure 4B:
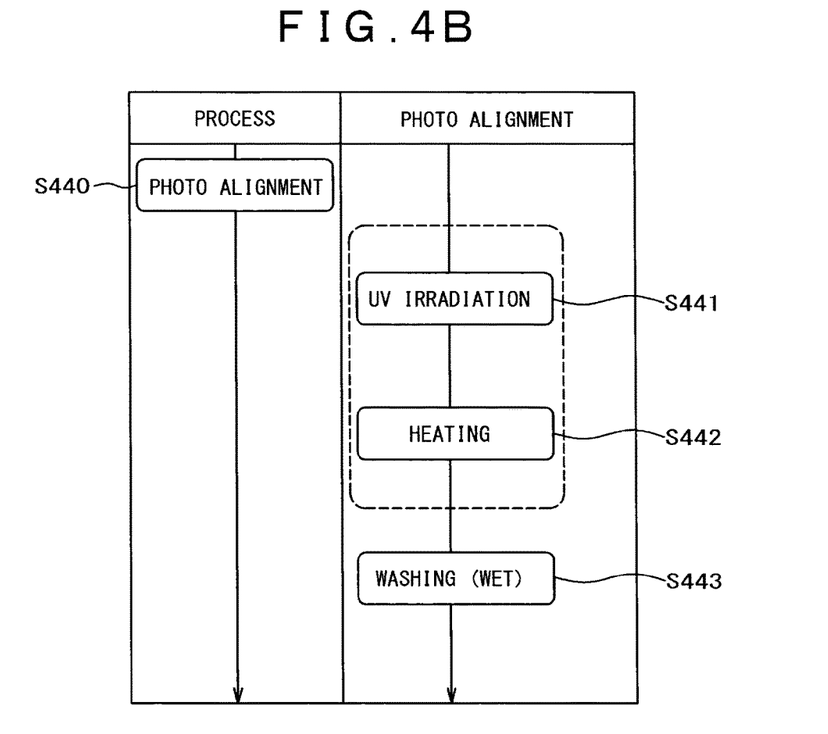
FIG. 4B is a flow chart of a photo alignment process in the manufacturing method of a liquid crystal display device according to the first embodiment of the invention.

First, a substrate 150 with TFT formed is prepared. Next, PI (polyimide) pre-washing before forming an alignment film is performed on the substrate using liquid medicine such as neutral detergent (Step S400). Next, a photo alignment film (PI film) is formed according to the flexographic printing or inkjet application (Step S410). Then, temporary calcination is performed on the PI film at the temperature of about 40° C. (Step S420). Continuously, main calcination is performed on the PI film in a bake furnace heated at the temperature of about 150° C. (Step S430). Then, the photo alignment processing is performed on the PI film (Step S440). The photo alignment processing (Step S440) includes PI photo decomposition by UV irradiation (Step S441), cross-link of a decomposed portion by heating and rearrangement (Step S442), and foreign substance removal and impurity removal by washing (wet) (Step S443), as illustrated in FIG. 4B. The UV irradiation is performed using the UV irradiation device having an aperture as illustrated in FIG. 7. The wavelength of the UV light is changed depending on the material of the photo alignment film to be used and is not restricted to a specified value.

Figure 5A:
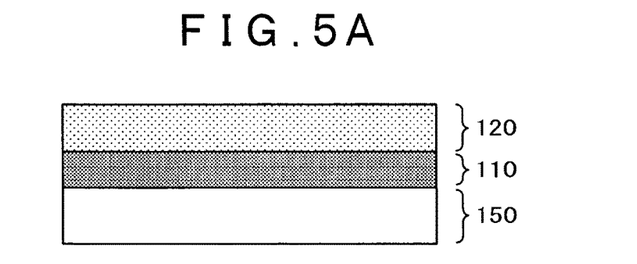
FIG. 5A is a schematic cross-sectional view of a TFT substrate or a CF substrate for use in describing the alignment film forming process in the manufacturing method of a liquid crystal display device according to the first embodiment of the invention.
Figure 5B:
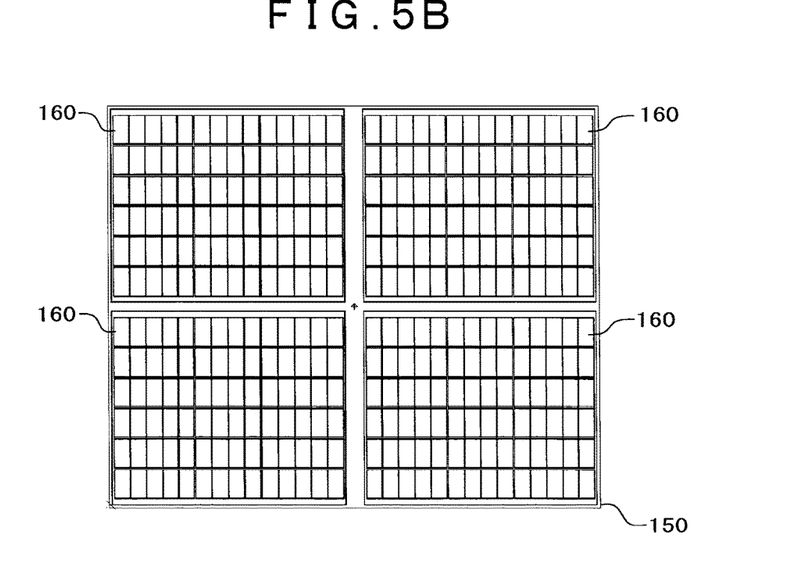
FIG. 5B is a schematic top plan view of the TFT substrate or the CF substrate for use in describing the alignment film forming process in the manufacturing method of a liquid crystal display device according to the first embodiment of the invention.

An example of the cross-sectional view of a substrate with the photo alignment film formed is illustrated in FIG. 5A. In FIG. 5A, in the case of a substrate (TFT substrate) with a thin film transistor (TFT) formed, a reference numeral 110 denotes a TFT multilayer structure film including component elements of, for example, a gate insulating film and a gate electrode, a semiconductor layer, source and drain electrodes, an inorganic protective film, an organic protective film, and a pixel electrode. In the case of a substrate (CF substrate) with a color filter (CF) formed, the reference numeral 110 is a CF multilayer structure film including component elements of, for example, a color filter, a black matrix, and an overcoat film. Further, an example of the top plan view of the substrate is illustrated in FIG. 5B. The substrate 150 includes a plurality of display panel areas 160.

Figure 9:
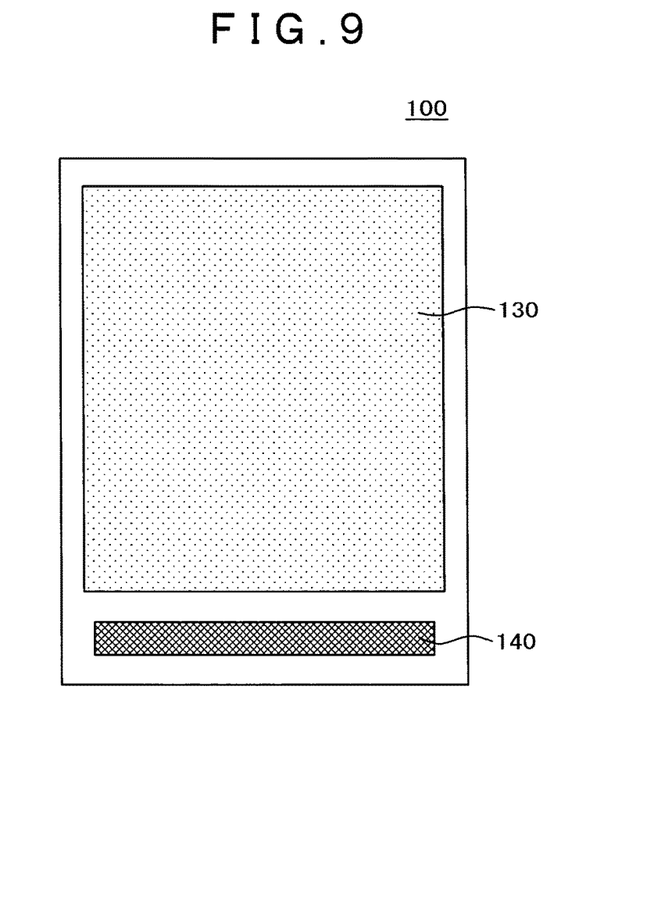
FIG. 9 is a schematic top plan view of the liquid crystal display device.

The TFT substrate with the photo alignment film formed is attached to the CF substrate with the photo alignment film formed in a way of facing the respective photo alignment films, and a liquid crystal layer is interposed between the substrates and divided into individual display panels. Then, by combining the individual display panels with a backlight (Step S450 in FIG. 4A), for example, a plurality of liquid crystal display devices 100 illustrated in FIG. 9 are completed. A reference numeral 130 denotes a display area and a reference numeral 140 denotes a driving circuit portion.

In manufacturing a liquid crystal display device according to the above procedure, an even exposure amount (accumulated exposure amount) can be obtained in a wide range in the longitudinal direction of the bar-like UV lamp, hence to improve the yield and the throughput (productivity). Further, there can be provided a UV irradiation device capable of supplying an even exposure amount. Further, there can be provided a liquid crystal display device of high quality with small variations in quality even if a medium and small sized liquid crystal display device.

As mentioned above, according to the embodiment, it is possible to provide a manufacturing method and a manufacturing apparatus of a liquid crystal display device capable of performing photo alignment evenly.

Second Embodiment

A second embodiment of the invention will be described. The matters not described here but have been described in the first embodiment are to be applied to this embodiment unless otherwise noted. Instead of a change of the shape of an aperture, ultraviolet light transmittance of an aperture is changed in this embodiment. In other words, in the longitudinal direction of the bar-like UV lamp, the shape of the aperture remains in a rectangle and the ultraviolet light transmittance of the center portion of the aperture is set lower than the ultraviolet light transmittance on the both ends. Here, both the aperture shape and the ultraviolet light transmittance of the aperture can be changed.

As a method of changing the ultraviolet light transmittance, materials with different ultraviolet light transmittances can be used respectively for the center portion and the both end portions of the aperture. Alternatively, the both end portions of an aperture may be open and a material controlling the transmittance may be arranged in the center portion. Preferably, the space between the center portion and the both end portions having the different ultraviolet light transmittances is gradually changed in the ultraviolet light transmittance.

In the UV irradiation device illustrated in FIG. 2, instead of the aperture 240b, an aperture having the center portion and the both end portions with the different ultraviolet light transmittances in the longitudinal direction of the bar-like UV lamp is used to form a photo alignment film according to the procedure illustrated in FIGS. 4A and 4B, hence to manufacture a liquid crystal display device. As a result, an even exposure amount (accumulated exposure amount) in a wide range in the longitudinal direction of the bar-like UV lamp can be obtained, hence to improve the yield and the throughput (productivity). Further, there can be provided a UV irradiation device capable of supplying an even exposure amount. Further, there can be provided a liquid crystal display device of high quality, with small variations in quality, even if a medium and small sized liquid crystal display device.

As mentioned above, according to the embodiment, it is possible to provide a manufacturing method and a manufacturing apparatus of a liquid crystal display device capable of performing photo alignment evenly. Further, since the center portion and the both end portions of the aperture have different ultraviolet light transmittances, with the ultraviolet light passing area remaining in a rectangle shape, the ultraviolet light transmittances of the center portion and the both end portions can be largely changed and adjusted without changing the outer measurements of the aperture.

It is understood that within the category of the spirit of the invention, various modifications and changes which can be easily arrived at by those skilled in the art are to belong to the scope of the invention. For example, an aperture may be called a light shielding plate or another name as far as the structure thereof can actually obtain the effect of the invention. Further, combination of two or more materials having different openings may form the structure capable of achieving the ultraviolet light transmittance of the invention.

For example, addition or deletion of some component element or a little design change, or addition or omission of some process or a little condition change properly performed on the above mentioned embodiments by those skilled in the art are to be included in the scope of the invention as far as being provided with the meanings of the invention.

Further, it is understood that other functions and effects derived from the forms described in the embodiments, which are obvious from the description of the specification or can be easily arrived at by those skilled in the art, are naturally derived from the invention.

What is claimed is:

1. A manufacturing method of a liquid crystal display device including a display panel with a liquid crystal layer interposed between substrates, comprising:
    a first process of preparing a first substrate with a thin film transistor formed thereon;
    a second process of forming a photo alignment film on the first substrate;
    a third process of irradiating the photo alignment film with ultraviolet light emitted from a bar-like UV lamp to align the photo alignment film, and
    a fourth process of interposing the liquid crystal layer between the first substrate and a second substrate,
    wherein to even an exposure amount of the ultraviolet light in a first area of the first substrate passing through a lower central portion of the bar-like UV lamp arranged in an elongated way in a direction relatively crossing a proceeding direction of the first substrate and in a second area of the first substrate passing through lower end portions of the bar-like UV lamp, in an aperture for defining an irradiation area of the ultraviolet light, areas of the aperture corresponding to the first area and the second area are different in opening width, or different in ultraviolet light transmittance,
    wherein the ultraviolet light is irradiated from directly above the first area and the second area, toward the first area and the second area,
    wherein to even the exposure amount, the ultraviolet light is irradiated through a surface opposed to the ultraviolet light of aperture having a larger opening width in the end portions corresponding to the second area than in the center portion corresponding to the first area.

2. The method according to claim 1, wherein to even the exposure amount means that variations are within ±5%.

3. The method according to claim 1, wherein to even the exposure amount, the ultraviolet light is irradiated through a surface opposed to the ultraviolet light of aperture having a larger ultraviolet light transmittance in the end portions corresponding to the second area than in the center portion corresponding to the first area.

4. The method according to claim 1, wherein the aperture is formed in that a space between a portion with a narrow opening width and a portion with a wide opening width has a taper shape of gradually decreasing in width from the portion with the wide opening width to the portion with the narrow opening width in planar view.

5. The method according to claim 1, wherein the ultraviolet light to irradiate the first substrate is a linearly polarized light.

6. The method according to claim 1, wherein the first substrate includes a plurality of display panel areas in a longitudinal direction of the bar-like UV lamp.

* * * * *